(12) United States Patent
Wasmuht et al.

(10) Patent No.: US 8,968,805 B2
(45) Date of Patent: *Mar. 3, 2015

(54) METHOD FOR BREWING BEER

(75) Inventors: Klaus-Karl Wasmuht, Ellingen (DE); Kurt Stippler, Marzling (DE)

(73) Assignee: Krones AG, Neutraubling (DE)

( * ) Notice: Subject to any disclaimer, the term of this patent is extended or adjusted under 35 U.S.C. 154(b) by 975 days.

This patent is subject to a terminal disclaimer.

(21) Appl. No.: 12/730,710

(22) Filed: Mar. 24, 2010

(65) Prior Publication Data

US 2010/0178385 A1 Jul. 15, 2010

Related U.S. Application Data

(63) Continuation of application No. 10/553,027, filed as application No. PCT/EP2004/002286 on Mar. 5, 2004, now Pat. No. 7,735,413.

(30) Foreign Application Priority Data

Apr. 15, 2003 (EP) .................................. 03008100

(51) Int. Cl.
*C12C 7/00* (2006.01)
*C12C 13/08* (2006.01)
(52) U.S. Cl.
CPC ...................................... *C12C 13/08* (2013.01)
USPC .................................. 426/16; 99/276; 99/278
(58) Field of Classification Search
USPC ........................ 99/276, 277, 278; 426/16, 520
See application file for complete search history.

(56) References Cited

U.S. PATENT DOCUMENTS

| 5,522,305 A | 6/1996 | Widhopf |
| 5,865,093 A | 2/1999 | Wasmuht et al. |
| 2006/0191418 A1 | 8/2006 | Wasmuht et al. |

FOREIGN PATENT DOCUMENTS

| DE | 3504500 C1 | 7/1986 |
| DE | 3608416 | * 6/1987 |
| DE | 3819355 | * 12/1989 |
| DE | 3442516 C1 | 9/1992 |
| DE | 4304383 C1 | 4/1994 |
| DE | 19634010 A1 | 4/1997 |
| EP | 0605783 A1 | 7/1994 |
| WO | WO-99/13050 A2 | 3/1999 |
| WO | WO-00/00583 A1 | 1/2000 |

* cited by examiner

*Primary Examiner* — Reginald L Alexander
(74) *Attorney, Agent, or Firm* — Marshall, Gerstein & Borun LLP

(57) ABSTRACT

A device for brewing beer, particularly a wort pan (1), with a container body (2) to receive a wort reservoir (3) is described. The device contains an internal boiler (4) arranged in the container body (2), which is provided with a heat exchanger (5) and a guiding screen (8). Furthermore a wort forced flow (10) provided with a pump is also provided, which runs through the boiler (4). In order to increase the efficiency of the device, the wort forced flow (10) has a thin-layer distributor (17) for the wort, which contains a pipe subsection (11*b*) connected with the pump, which subsection leads above the guiding screen (8) via an outlet opening (13) with reduced outlet cross-section into the container body (2). Furthermore, above the outlet opening (13), a flow-guiding baffle surface (15) is provided, at which the flow arrives from below, to deflect the liquid towards the wort reservoir (3).

2 Claims, 2 Drawing Sheets

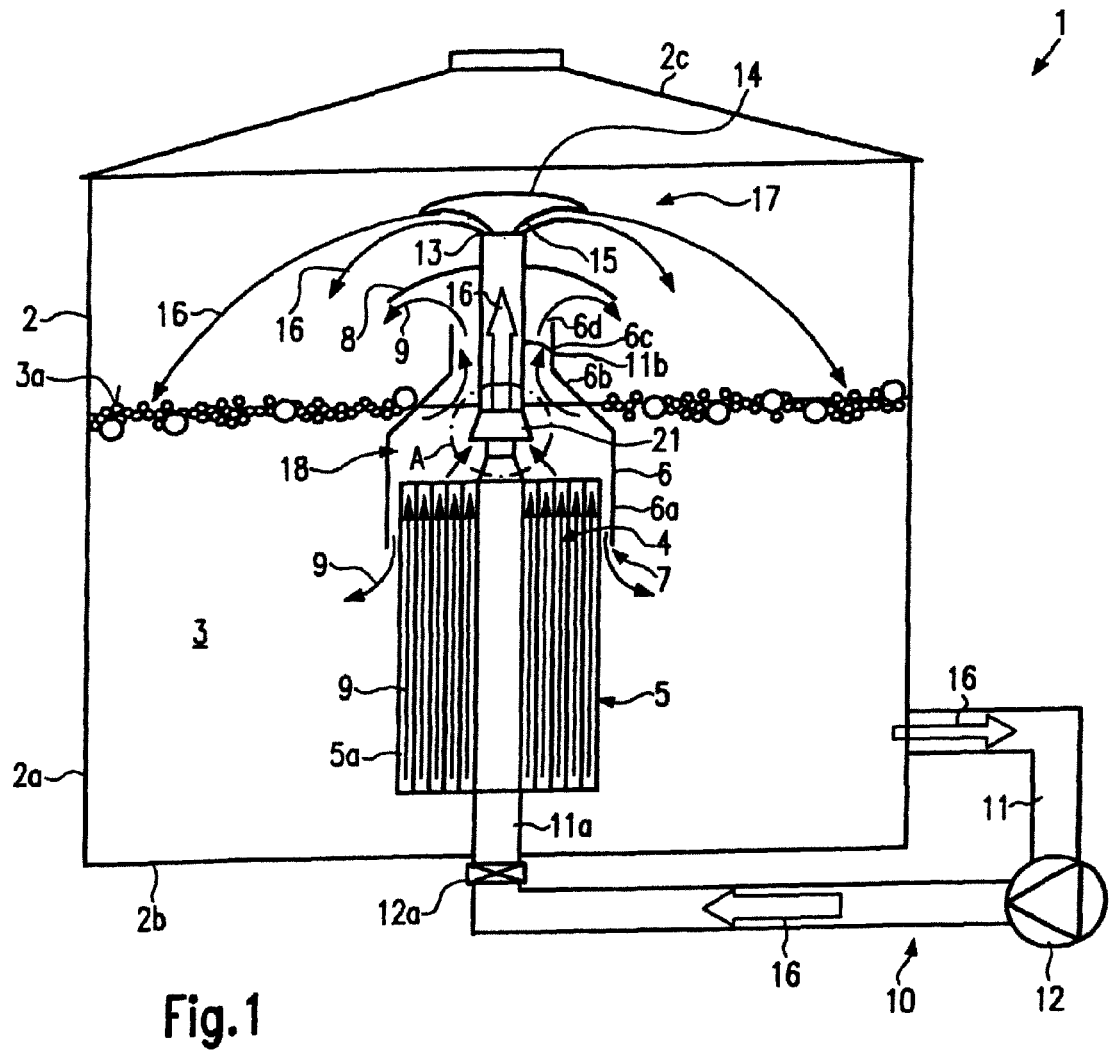
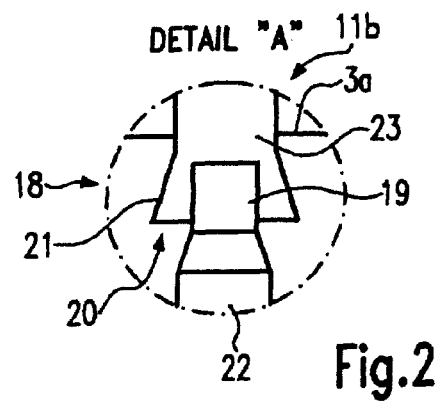
Fig.1
Fig.2

METHOD FOR BREWING BEER

REFERENCE TO RELATED APPLICATIONS

This is a Continuation of U.S. patent application Ser. No. 10/553,027, which was the U.S. national stage, under 35 U.S.C. §371, of international application no. PCT/EP2004/002286, having an international filing date of Mar. 5, 2004, and claims priority to European application no. 03008100.4, filed Apr. 15, 2003.

The disclosure relates to a device and a method for brewing beer.

BACKGROUND OF THE DISCLOSURE

A wort pan of this type is known for example from DE-C-43 04 383. The known wort pan contains a container body in which a so-called internal boiler is located to heat up the wort. The internal boiler is made as a steam-heated heat exchanger with vertically running passage ducts for the wort, so that the wort rises upwards from the base of the container through the heating in the heat exchanger. Above the heat exchanger, the internal boiler contains an accumulation cone with a cylindrical outlet pipe through which the thermoflow of the wort is bundled and conveyed upwards above the liquid level of the wort in the container body. Above the mouthpiece opening of the cylindrical outlet pipe, a guiding screen is provided in the form of a conical baffle surface which picks up the wort emerging from the cylindrical outlet pipe and diverts it downwards again towards the liquid level. The known wort pan contains moreover a pipe with a pump for a forced flow of the wort in the container body, whereby the wort is drawn off out of the container body outside the internal boiler and pumped back into the container body directly underneath the internal boiler. The area underneath the internal boiler and around the mouth of the pipe is shut off from the rest of the container body, so that it is ensured that the wort passed by forced flow through the pipe only enters the internal boiler and does not escape at the side into the container body. However, it has been found that the known wort pan can be improved yet further in terms of its efficiency.

SUMMARY OF THE DISCLOSURE

The object of the disclosure is therefore to provide a device and a method of this type with an improved efficiency.

Because of the thin-film distributor provided and arranged according to the disclosure with its reduced outlet cross-section and the baffle surface above it, the energy passed into the wort through the pump in addition to the heat flow is used advantageously to feed the wort, in addition to the normal wort cycle and the distribution by the internal boiler, into a second cycle with fine distribution through which, for example, the steaming out of undesired flavours is further improved.

Admittedly, a thin-film distributor is already known, for example, from WO 00/00583, but there it replaces the boiler.

Moreover, it is known for example from EP-A-605 783 that an internal boiler for a wort pan is provided with two wort guiding screens lying vertically above each other, whereby the lower wort guiding screen is provided with a center opening through which the thermoflow caused by the heat exchanger can enter upwards, so that two distribution bells for the wort are formed, which, however, because of the relatively low flow speed, are less effective.

In contrast, the mouth cross-section, reduced according to the disclosure, of the pipe supplied by a pump ensures that a smaller volume of the wort emerges at the same time from the mouth opening, the speed of which, however, is much higher than a pure flow of heat. In this way, the baffle surface creates a wort bell with a considerably smaller layer thickness, which greatly improves in particular the steaming out of undesired flavors.

The additional infeed device according to claim 4 is particularly advantageous, since this increases the flow rate through the thin-film distributor and at the same time accelerates the flow through the internal boiler, which increases the throughput and reduces fouling. This applies in particular for an automatic suction according to claim 5 or 6, since in this way, the full throughput capacity is reached.

The form of the baffle surface is particularly important in relation to the formation of the thinnest possible layer. Preferably, the baffle surface should be already provided in the mouth opening, and from there it runs, gently curved, at an angle upwards to the outside.

Shaping the mouth opening as a circular gap which can if necessary be adjusted in size also promotes the formation of a thin layer.

BRIEF DESCRIPTION OF THE DRAWINGS

Embodiments of the invention are explained in more detail in the following using the drawings. The following are shown:

FIG. 1 shows a wort pan formed according to the disclosure in a highly diagrammatic illustration, and FIG. 2 shows detail "A" from FIG. 1 in a section.

DETAILED DESCRIPTION OF THE DISCLOSURE

Figure 3:
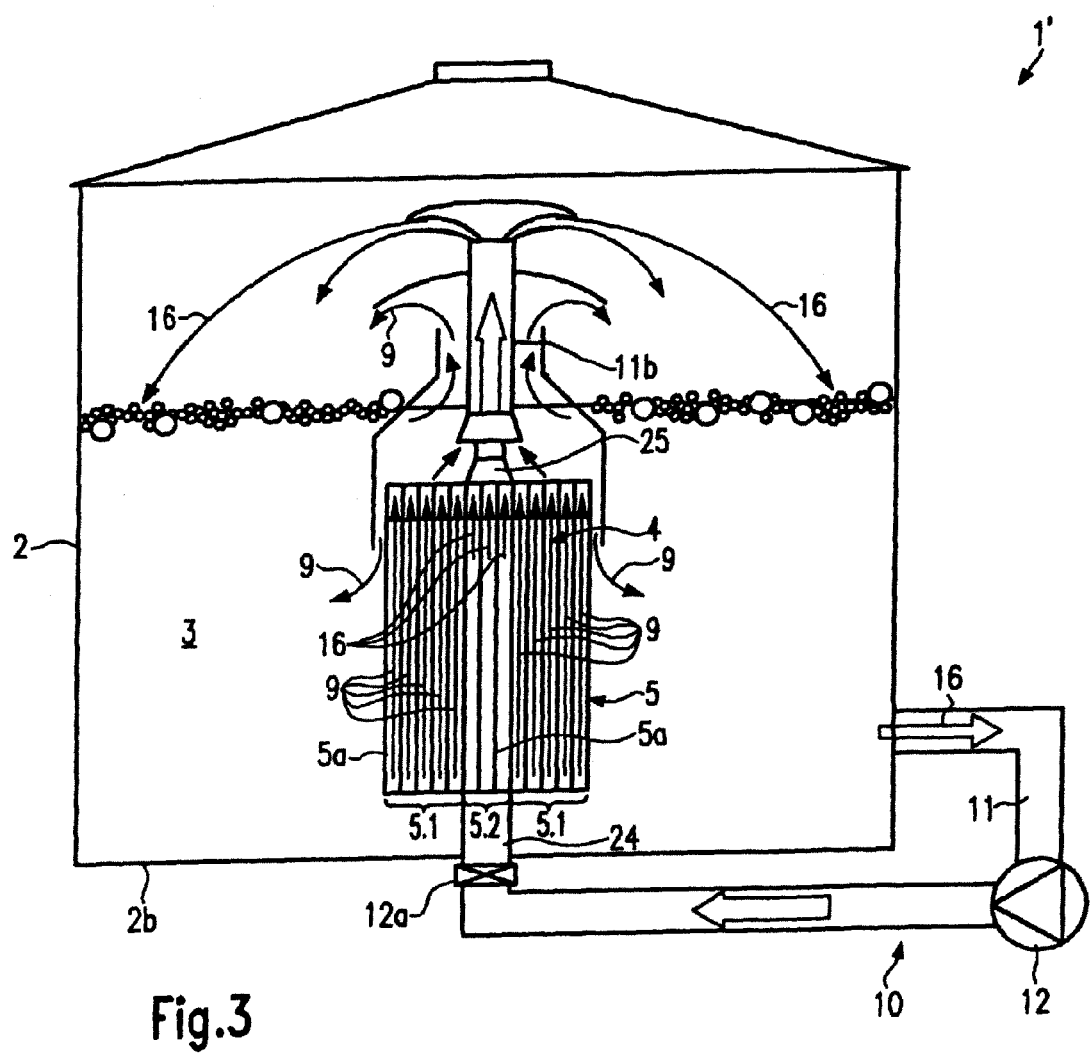
FIG. 3 shows a further embodiment of the disclosure.

FIG. 1 shows a device for brewing beer in the form of a wort pan 1, especially a whirlpool pan, as used for the manufacture and preparation of wort in beer manufacture. The wort pan 1 contains a normal container body 2 with side walls 2a, a base 2b and a cover 2c which can be of the normal shape. In the embodiment illustrated, the container body 2 has a circular cross-section and is erected with a vertical axis. The container body 2 holds a sufficient quantity of the wort reservoir 3.

In the axial middle of the container body 2, an internal boiler 4 is positioned which, as is normal for these internal boilers, has a heat exchanger 5 and an accumulation cone 6. The heat exchanger 5 has a large number of pipes 5a, which are installed with vertical axes and open ends and are heated preferably by steam or hot water, whereby the devices for supplying steam and other devices necessary for the operation of the internal boiler 4 and the wort pan 1 are known and are not shown here to give greater clarity. The pipes 5a are arranged with their open, lower ends at a sufficient distance above the base 2b and end with their open, upper ends underneath the liquid level 3a of the wort 3 in container body 2.

In the present description, the terms "top" and "bottom" are defined with reference to the direction of gravity in the installation position of the respective device in operation.

The accumulation cone 6 has, in the present embodiment, a cylindrical area 6a, the lower edge of which has a larger diameter than the heat exchanger 5, so that there is, between the heat exchanger 5 and the cylindrical area 6a of the accumulation cone 6, an opening 7, through which wort can pass. The cylindrical area 6a is continued upwards through a conical area 6b, which reaches to above the liquid level 3a and then leads into a second cylindrical area 6c which reaches from the conical area 6b far enough upwards to bundle and even out the thermoflow of the wort from the heat exchanger 5. The cylindrical area 6c has the same cross-section between the conical area 6b and its mouth opening 6d. Above the mouth opening 6d of the accumulation cone 6 and at a distance from it, one of the normal flow guiding screens 8 is provided which is bent like a spherical calotte, i.e. near the axial center, has its highest point above the mouth opening 6d and falls down on all sides with increasing radial distance.

The internal boiler 4, as it has been described so far, also functions like a normal internal boiler, i.e. the heating in the heat exchanger 5 sets up a heat cycle, i.e. the wort rises within pipes 5a upwards into the accumulation cone 6, is bundled there into a laminar flow and aligned and pressed through the mouth opening 6d upwards against the guiding screen 8, which passes the heated wort in an outlet bell back into the wort reservoir 3, as is designated by the arrows 9. Furthermore, a small proportion of the flow can leave the accumulation cone 6, also indicated by an arrow 9, through the opening 7, which creates additional turbulence in the wort reservoir 3. The flow along the arrows 9 forms the main flow inside the wort pan 1.

At the wort pan 1, a forced wort circulation 10 is furthermore provided, which comprises at least a pipe 11 and a preferably frequency-controlled pump 12. The pipe 11 emerges in the lower third in the area of the wort reservoir 3 from the side wall 2a of the container body 2, runs via pump 12 and if necessary via a control valve 12a (if the pump 12 is not frequency-controlled) and is passed back in the axial center regarding the internal boiler 4 through the base 2b of the container body 2. The pipe 11 continues vertically upwards in the inside of the container body 2 as a riser. If the forced flow 10 contains several pipes 11, these are taken via a common pump and if necessary a common control valve into a common riser. The riser contains a first pipe subsection 11a, which runs vertically upwards from the intake of the pipe 11 into the container body 2 through the heat exchanger 5, and a second pipe subsection 11b connected to it, which projects beyond the heat exchanger 5 and goes through the remaining internal boiler 4, i.e. the accumulation cone 6 and the guiding screen 8 and projects beyond the guiding screen 8. Here, the second pipe subsection 11b is open on the end to form an outlet opening 13 which is essentially horizontal.

Above the outlet opening 13, a guide device 14 is located with a baffle surface 15 facing downwards. The baffle surface 15 dips into the outlet opening 13 or begins there, near the axial center of the outlet opening 13 and rises from there, gently curved at an angle upwards and outwards, whereby the curve of the baffle surface 15 is formed in such a way that near to the outlet opening 13 the axial parts of the curve predominate, but that these decrease in the further course of the curve, until the radial parts of the curve predominate. In the outer edge region of the guide device 14 at its greatest radial distance from the centre line, the curve can show axial parts again, i.e. the outer edge of the baffle surface 15 can be slightly curved downwards again. Preferably, the baffle surface 15 can be formed as a rotation surface of a hyperbola- or parabola-type curve section.

The part of the baffle surface 15 dipping into the pipe subsection 11b gives the outlet opening 13 directly at the upper edge of the pipe subsection 11b a considerably decreased outlet cross-section, whereby the outlet opening 13 becomes ring-shaped. The outlet cross-section of the outlet opening 13 can, if there is a corresponding curve in the baffle surface 15, be adjusted in its size through an axial displacement of the guide device 14.

Through the pump 12, wort is sucked from the wort reservoir 3 via the pipe 11 and pushed into the riser, and, accelerated due to the reducing outlet cross-section of the outlet opening 13 directly at the end of the pipe subsection 11b, but reduced in terms of volume, is conveyed with a high level of energy against the baffle surface 15 so that the wort is distributed there in the form of a thin-layer bell along arrows 16 and passes again into the reservoir 3. The pump, the outlet opening 13 with reduced cross-section and the baffle surface 15 thus form a thin-layer distributor 17.

The thin-layer distributor 17 contains furthermore an additional infeed device 18 which is also shown in FIG. 2. The infeed device 18 comprises an area 19 of the pipe subsection 11b with a reduced cross-section which is located below the liquid level 3a in the wort reservoir 3 and within the accumulation cone 6. The area 19 with reduced cross-section forms a suction opening 20, which is covered towards the top by a conical apron 21, so that the suction opening 20 is only accessible from underneath at an angle, i.e. from the direction of the outlet pipes 5a of the heat exchanger 5. In the embodiment shown, the pipe subsection 11b is divided into two to form the infeed device 18 and contains a lower pipe piece 22, which forms the connection to the lower pipe subsection 11a and passes into the area 19 with reduced cross-section, and an upper pipe piece 23, which is arranged coaxially to the area 19 and runs as far as the outlet opening 13, whereby the pipe piece 23 essentially has the same internal diameter as the riser in the first pipe subsection 11a.

The area 19 with reduced cross-section creates, according to the water jet pump principle, a flow which sucks additional wort from the area above the heat exchanger 5 and conveys it into the inside of the pipe subsection 11b. In this way, on the one hand, the flow quantity 16 is increased and, on the other hand, the through flow of the heat exchanger 5 is improved, so that the transfer of heat can be improved and fouling in the boiler reduced.

During the operation of the wort pan 1 according to the disclosure, the internal boiler 4 of the wort reservoir 3 is heated, whereby the heating in the heat exchanger 5 ensures a first cycle of the wort 3 along the arrows 9. At the same time, through pump 12 and one or preferably several pipes 11 leading out of the container body 2, wort is sucked for a second cycle along the arrows 16 and pushed into the riser. Because the pipe subsection 11a runs through the heat exchanger 5, the flow caused by the pump is overlaid by a flow of heat, so that the wort is pushed with increasing energy through the infeed device 18, where in addition wort is sucked in above the heat exchanger 5. Subsequently, the pumped and sucked in wort is passed through the outlet opening 13 with reduced cross-section against the baffle surface 15 and taken from there back into the wort reservoir 3 distributed in a bell with a low layer thickness.

FIG. 3 shows a further embodiment of a wort pan 1' formed according to the disclosure, which corresponds to the wort pan 1 in FIGS. 1 and 2 apart from the details described in the following, so that these do not need to be explained again.

The embodiment according to FIG. 3 is particularly intended for the retrofitting of existing beer brewing devices. For this purpose, the pipe 11 of the wort forced flow 10 leading into the base 2b of the container body 2 is connected via a connector piece 24 with one or more ducts or pipes 5a of the heat exchanger 5 in such a way that two heat exchanger areas 5.1 and 5.2 essentially separated from each other are formed in the heat exchanger 5. The heat exchanger area 5.1 is connected as normal with the wort reservoir 3 in the container body 2, whilst the heat exchanger area 5.2 is supplied by the forced flow 10. At the upper outlet of the heat exchanger 5, a further connector piece 25 is provided which passes from the heat exchanger area 5.2 into the pipe subsection 11b. Here, the connector piece 25 can be formed at the same time as the lower pipe piece of the infeed device 18 (see FIG. 2).

The two wort cycles 9 and 16 are also formed with this embodiment according to FIG. 3.

As a modification of the described and drawn embodiment, the disclosure can be used with wort pans of any structural design, working unpressurized or under pressure and with any known construction of an internal boiler but also, for example, with heated forward flow containers or similar.

We claim:

1. A method for brewing beer comprising the steps of:
    forming a first flow of wort within a container wherein the first flow of wort is provided with heating the wort with a heat exchanger and moving the first flow of wort through the heat exchanger;
    forming a second flow of wort within the container wherein the second flow of wort is provided with wort of the second flow of wort positioned within a pipe and pumped through the pipe with a pump connected to the pipe and in fluid communication with the wort and wherein the pipe passes through the heat exchanger maintaining the first flow of wort and second flow of wort separated as the first and second flows of wort move through the heat exchanger; and
    providing an opening of the pipe at a position above the heat exchanger and in association with a baffle wherein the direction of wort exiting the pipe is redirected by the baffle.

2. A method for brewing beer comprising the steps of:
    forming a first flow of wort within a container wherein the first flow of wort is provided with heating the wort with a heat exchanger and moving the first flow of wort through the heat exchanger;
    forming a second flow of wort within the container wherein the second flow of wort is provided with wort of the second flow of wort positioned within a pipe and pumped through the pipe with a pump connected to the pipe and in fluid communication with the wort and wherein the pipe passes through the heat exchanger maintaining the first flow of wort and second flow of wort separated as the first and second flows of wort move through the heat exchanger; and
    providing a screen associated with the first flow of wort redirecting the wort of the first flow of wort that has passed through the heat exchanger.

* * * * *